(12) United States Patent
Slabbinck et al.

(10) Patent No.: US 7,350,345 B2
(45) Date of Patent: Apr. 1, 2008

(54) CUTTING PLATFORM FOR A COMBINE HARVESTER

(75) Inventors: Freddy Slabbinck, Zedelgem (BE); Dirk Vandenbroucke, Torhout (BE)

(73) Assignee: CNH America LLC, Racine, WI (US)

( * ) Notice: Subject to any disclaimer, the term of this patent is extended or adjusted under 35 U.S.C. 154(b) by 609 days.

(21) Appl. No.: 10/655,483

(22) Filed: Sep. 4, 2003

(65) Prior Publication Data

US 2004/0107684 A1  Jun. 10, 2004

(30) Foreign Application Priority Data

Sep. 4, 2002  (GB) ................... 0220540.9

(51) Int. Cl.
A01D 45/02  (2006.01)

(52) U.S. Cl. ...................................... 56/119

(58) Field of Classification Search .............. 56/119, 56/314, 105, 17.3, 319, 51, 109
See application file for complete search history.

(56) References Cited

U.S. PATENT DOCUMENTS

| | | | | |
|---|---|---|---|---|
| 703,497 A * | 7/1902 | Steward | ..................... | 56/319 |
| 2,751,744 A * | 6/1956 | Reade et al. | ................... | 56/119 |
| 2,817,941 A * | 12/1957 | Clapsaddle, Jr. | ............... | 56/119 |
| 3,214,894 A * | 11/1965 | Whitman | ........................ | 56/119 |
| 3,967,439 A * | 7/1976 | Mott | ................... | 56/314 |
| 4,037,393 A * | 7/1977 | Anderson | ..................... | 56/119 |
| 4,191,006 A * | 3/1980 | Kerber et al. | ................ | 56/11.6 |
| 4,214,422 A * | 7/1980 | McMillen | ..................... | 56/119 |
| 4,219,992 A * | 9/1980 | Henry, Sr. | ..................... | 56/119 |
| 4,296,593 A * | 10/1981 | Webb et al. | .................... | 56/98 |
| 4,333,304 A * | 6/1982 | Greiner et al. | ................. | 56/119 |
| 4,493,181 A * | 1/1985 | Glendenning et al. | ......... | 56/314 |
| 4,538,404 A * | 9/1985 | Heimark et al. | ............... | 56/314 |
| 4,700,537 A * | 10/1987 | Emmert | ....................... | 56/314 |
| 4,757,673 A * | 7/1988 | Gayman | ....................... | 56/314 |
| 5,528,887 A * | 6/1996 | Nagy et al. | .................... | 56/94 |
| 5,787,697 A * | 8/1998 | Post | ............................ | 56/119 |

(Continued)

FOREIGN PATENT DOCUMENTS

DE  128878  12/1977

(Continued)

OTHER PUBLICATIONS

Certified English Translation of Paragraphs 15-19 of previously-cited Foreign Patent Document EP 1036495 A1, orig dated Sep. 2000.

Primary Examiner—Árpád Fábián Kovács
(74) Attorney, Agent, or Firm—Rebecca Henkel

(57) ABSTRACT

A cutting platform for a combine harvester is fitted with a crop divider that is pivotable relative to the cutting platform between a forwards projecting operating position and a retracted transport position. The divider is supported on a member that forms part of the cutting platform by means of a link which is secured at one end to the member in a manner to allow the link to pivot relative to the member about a first axis and which is secured at its other end to the divider in a manner to allow the divider to pivot relative to the link about a second axis which is inclined relative to the first axis.

20 Claims, 5 Drawing Sheets

U.S. PATENT DOCUMENTS

| | | | | |
|---|---|---|---|---|
| 5,865,019 A | * | 2/1999 | Hurlburt et al. | 56/119 |
| 5,878,561 A | * | 3/1999 | Gunn | 56/98 |
| 6,247,297 B1 | * | 6/2001 | Becker | 56/119 |
| 6,715,273 B2 | * | 4/2004 | Weichholdt | 56/314 |

FOREIGN PATENT DOCUMENTS

| | | |
|---|---|---|
| EP | 0539745 A1 | 9/1992 |
| EP | 1036495 A1 | 3/2000 |

* cited by examiner

CUTTING PLATFORM FOR A COMBINE HARVESTER

FIELD OF THE INVENTION

The present invention relates to a cutting platform for a combine harvester fitted with a crop divider that is pivotable relative to the cutting platform between a forwards projecting operating position and a retracted transport position.

BACKGROUND OF THE INVENTION

Cutting platforms, such as grain and maize harvesting headers or gatherers, on combine harvesters are often provided with dividers at their lateral ends to separate the crop to be gathered from the standing crop. The dividers are generally triangular when viewed from the side and are mounted with their pointed end facing the direction of travel and projecting forwards from the remainder of the cutting platform.

The width of the cutting platform prevents a combine harvester from being driven along normal roads when it is in its working position. For this reason, it is known to separate the cutting platform from the combine harvester and to transport it on a trailer. When the cutting platform is mounted on a trailer for transportation, the crop divider projects laterally and this both increases the width of the transported load and presents a hazard to other road users.

It has been proposed to remove the divider completely from the cutting platform and to stack it on the cutting platform during transportation. This is not entirely satisfactory because the header bounces around as the trailer is pulled over uneven ground, which both generates noise and risks damaging the header and/or the divider.

EP-1 036 495 discloses a crop divider that can pivot relative to a header about a vertical axis so that the divider can be moved to a transport position in which, instead of pointing forwards, it points parallel to the axis of rotation of the header, i.e. at right angles to the direction of travel of the combine harvester.

DD 128878 shows an alternative solution to the problem in which the divider can pivot about a single axis so that its pointed end can be moved to a retracted transport position in which it faces backwards in the direction of travel.

OBJECT OF THE INVENTION

It is not however always possible to mount a divider on a cutting platform in a manner that permits to pivot about a single pivot into a retracted transport position and the aim of the invention is provide a more versatile way of moving the divider into a retracted transport position.

SUMMARY OF THE INVENTION

According to the present invention, there is provided a cutting platform for a combine harvester fitted with a crop divider that is pivotable relative to the cutting platform between a forwards projecting operating position and a retracted transport position, characterised in that the divider is supported on a member that forms part of the cutting platform by means of a link which is secured at one end to the member in a manner to allow the link to pivot relative to the member about a first axis and which is secured at its other end to the divider in a manner to allow the divider to pivot relative to the link about a second axis which is inclined relative to the first axis.

The member of the cutting platform to which the link is pivotably secured is preferably an arm that can be raised and lowered to enable the height of the divider above the ground during operation to be adjusted.

Advantageously, the link is pivotable relative to the cutting platform about a generally horizontal first axis and the second axis is perpendicular to the first axis.

As in DD 128878, the use of an articulated link permits the crop divider to be moved to a transport position in which it points backwards in the direction of travel but enables collision between the divider and the cutting platform to be avoided during its relocation from the operating position to the transport position.

BRIEF DESCRIPTION OF THE DRAWINGS

The invention will now be described further, by way of example, with reference to the accompanying drawings, in which.

DETAILED DESCRIPTION OF THE PREFERRED EMBODIMENT

Figure 1:
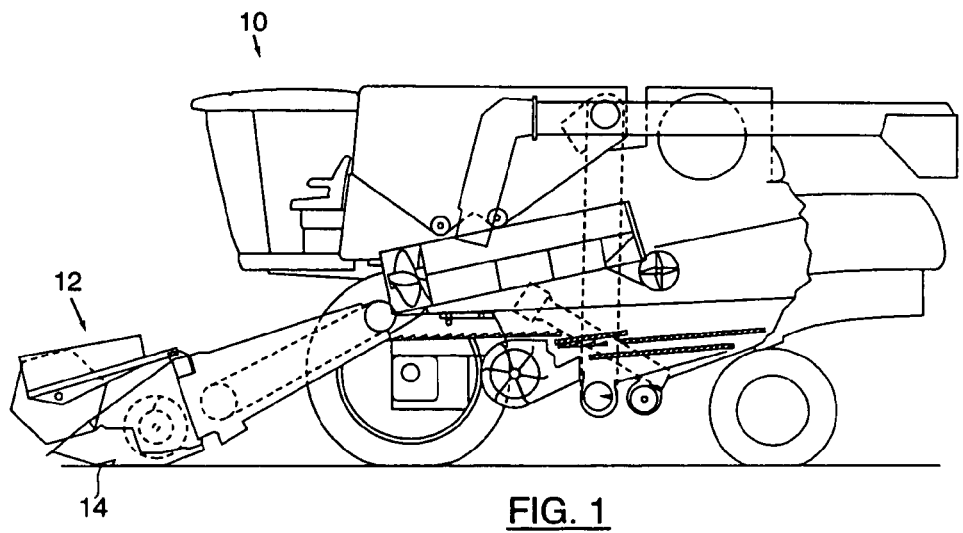
FIG. 1 is a side view of the front end of a combine harvester fitted with a header having a forwardly projecting crop divider.

FIG. 1 shows a combine harvester 10 fitted with a header 12 having a forwardly projecting crop divider 14. The divider 14 is made of sheet metal that is bent into the shape of a cone and its function is to separate the crop to be harvested from the standing crop. The height of the divider 14 above the ground needs to be adjustable and for this reason it is mounted on a support arm 16 that can be raised and lowered. The header shown in FIG. 1 is of course only one type of cutting platform and other crop gatherers may be used in its place.

Figure 2:
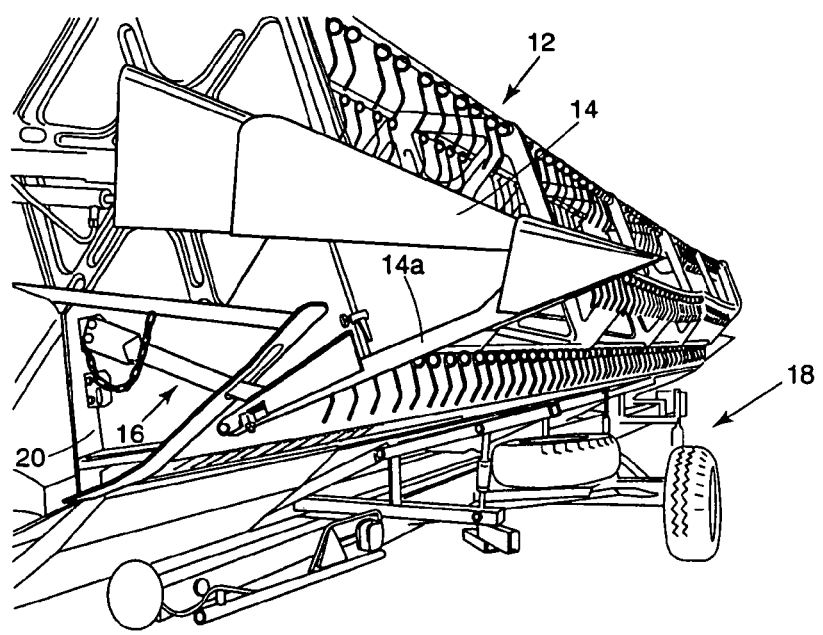
FIG. 2 is a view of a header mounted for transportation on a trailer with the divider shown in the operating position.
Figure 3:
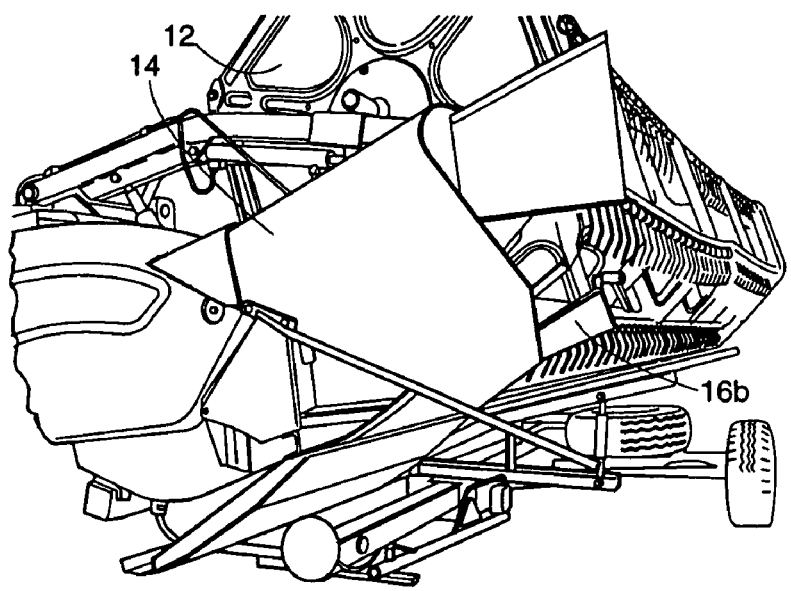
FIG. 3 is a view similar to that of FIG. 2 showing the divider rotated towards its retracted position.
Figure 4:
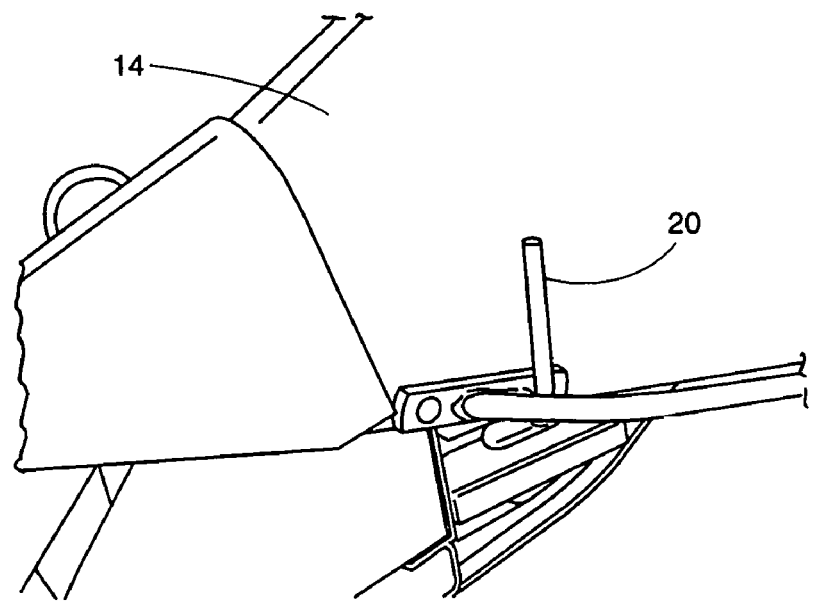
FIG. 4 is a detail of the divider when stowed in its fully retracted position.

To transport the header 12 on a road, it is separated from the combine harvester and placed on a trailer 18 as shown in FIG. 2. However, as can be seen in FIG. 2, if the divider 14 were to be left in its operating position when transported on a trailer, the divider 14 would stick out to one side beyond the remainder of the load and would present a hazard. To avoid this problem, the divider 14 is mounted on the support arm 16 in such a manner that it can be rotated to a retracted position, as shown in FIG. 3, in which it points in the opposite direction from its operating position. In the retracted position, the divider 14 can be stowed away in a U-shaped bracket 20 which supports the weight of the divider 14.

The mounting of the divider 14 on its support arm 16 will now be described by reference to FIGS. 5 to 9. The support arm 16 is formed of a tubular part 16*a* which terminates in a fixing bracket 16*b*. The tubular part 16*a* is adjustably mounted on the cutting platform to allow the divider 14 to be raised and lowered.

Figure 6:
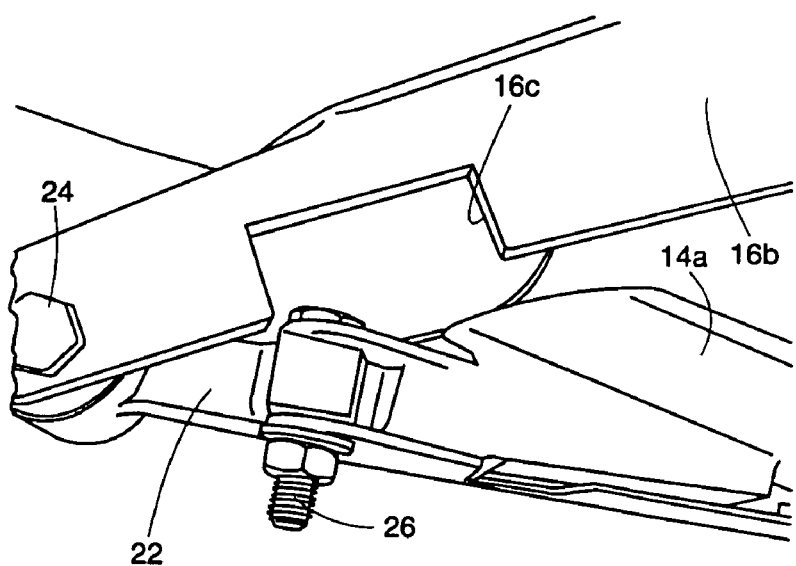
FIG. 6 is a detail to a further enlarged scale showing the link that connects the divider to its support arm.
Figure 7:
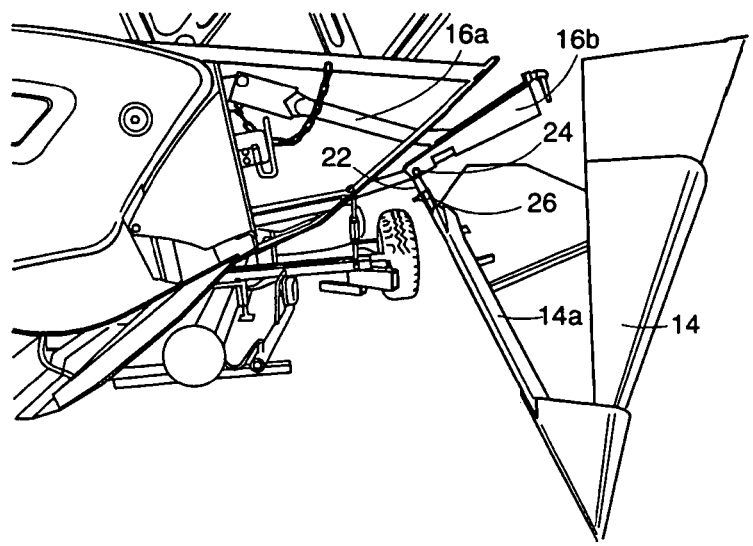
FIG. 7 shows the divider in an intermediate position during transition from the operating position to the transport position.
Figure 8:
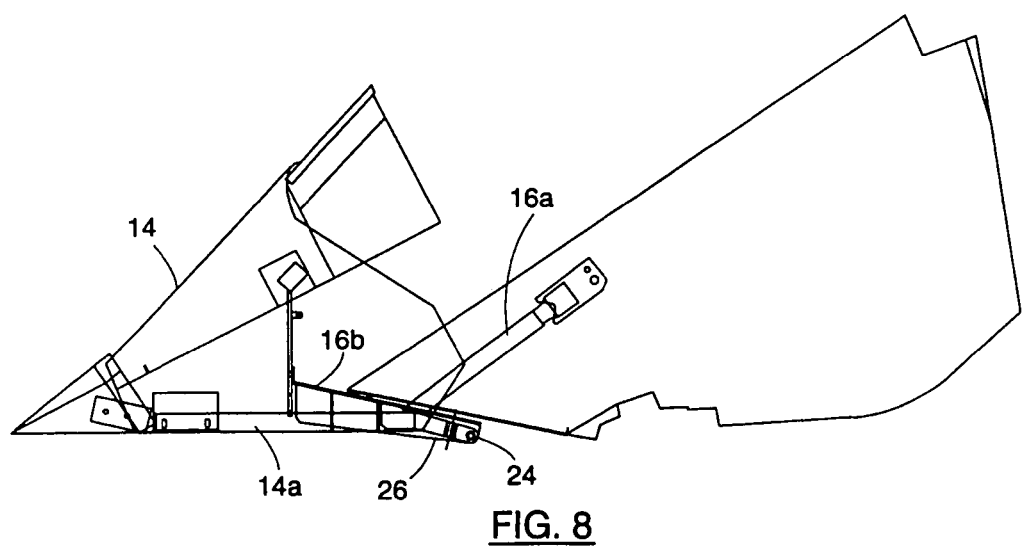
FIG. 8 is a schematic side view of the divider in its operating position.
Figure 9:
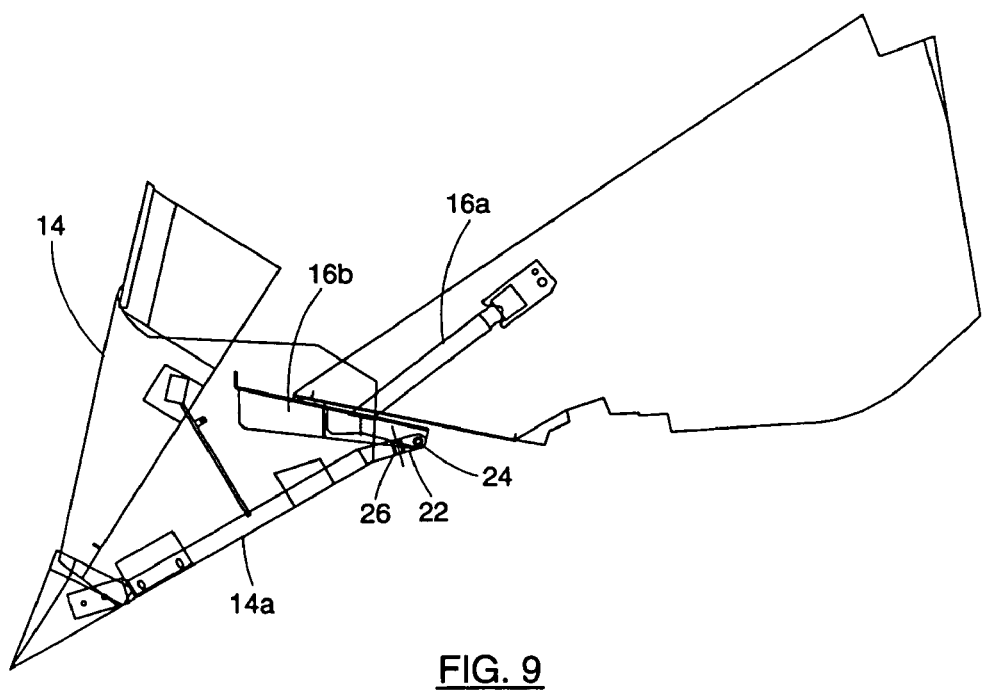
FIG. 9 is a view similar to that of FIG. 8 showing the divider in an intermediate position during transition from the operating position to the transport position.

The fixing bracket 16*b* is formed as an inverted U-shaped channel that rotatably supports a link 22, which is best seen in FIG. 6. The link 22 is pivoted at one end about a bolt 24 which passes through the two limbs of the bracket 16*b*. The bolt 24 is generally horizontal in all positions of the support arm 16. The opposite end of the link 22 has a bolt 26 which lies at right angles to the bolt 24 and acts as a pivot for the divider 14. The divider 14 is provided along its lower edge with a reinforcement tube 14*a* and it is the end of the latter tube 14*a* that is pivotable about the bolt 26.

Figure 5:
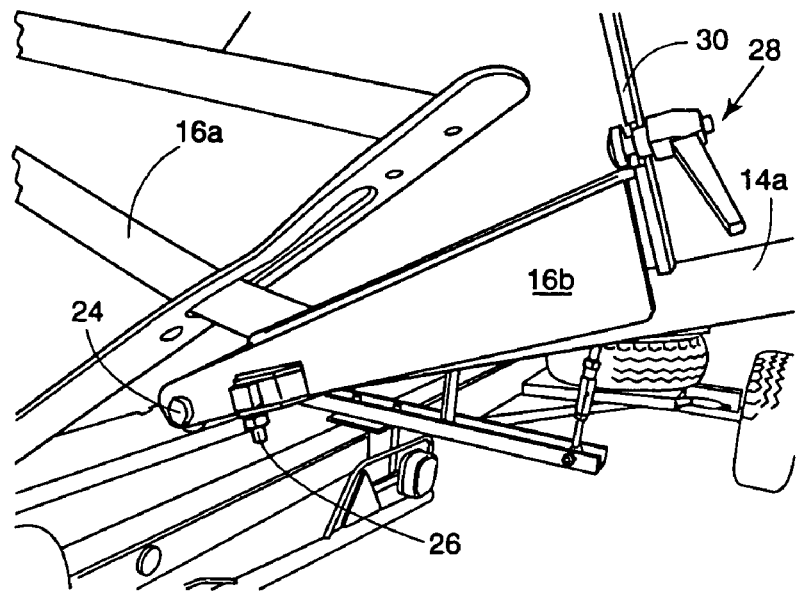
FIG. 5 is a detail of the divider in its operating position, showing the attachment of the divider to its support arm.

In the operating position of the divider 14, shown in FIG. 5, the divider 14 is raised so that the reinforcement tube 14*a* lies between the limbs of the bracket 16*b*. This prevents the divider from pivoting to the left or right about the bolt 26 (all directions are with reference to the direction of movement of the divider when in operation). Furthermore a manually operated clamp 28 engages a catch plate 30 that projects from the divider 14 to prevent the divider 14 from pivoting about the bolt 24. Thus, in the operating position, the divider acts as a rigid extension of the support arm 16 and cannot move relative to it.

To move the divider 14 to its backwards facing transport position, it is not possible just to pivot it about the bolt 26 because it is prevented by the bracket 16*b* from moving in this manner. Instead, the support arm 16 is raised to provide ground clearance and the clamp 28 is manually released. This now allows the divider 14 to be lowered by hand first into the position shown in FIGS. 6 and 9 then into the position shown in FIG. 7.

As the divider is lowered, the reinforcement arm 14*a* separates from the bracket 16*b* and the pivot surrounding the bolt 26 leaves a recess 16*c* in one of the limbs of the bracket 16*b* in which it is accommodated in the operating position of the divider 14. Even in the position of FIGS. 6 and 9, the divider cannot be rotated about the pivot 26 because its tail would collide with the bracket 16*b*. Hence the divider must continue to be lowered relative to the support arm 16 until it reaches the position shown in FIG. 7. In this position, the pivot axis of the bolt 26 is nearly horizontal and the divider 14 can be rotated about the bolt 26 so that it point upwards without any part of it colliding with the support arm 16.

After the divider has been pivoted about the bolt 26 to point upwards in this manner, its front end is allowed to drop under its own weight this being accompanied by a rotation of the divider 14 and the link 22 about the bolt 24. The link 22 is retracted into the recess 16*c* with the reinforcing arm 14*a* of the divider lying to one side of the bracket 16*b*. Finally, the divider 14 is lowered into its fully retracted position in which its weight is supported on the bracket 20, which constitutes one form of storage device. The bracket 20 also prevents the divider from pivoting about the bolt 26 when it is in the transport position and it therefore holds the divider 14 neatly against the cutting platform.

The doubly articulated link 22 can thus be seen to permit the divider 14 to be moved to its retracted position without the divider colliding with the bracket 16*b* which provides for its position locating in the operating position.

The invention claimed is:

1. A cutting platform for a combine harvester fitted with a crop divider that is pivotable relative to the cutting platform between a forwards projecting operating position and a retracted transport position, characterized in that the divider is supported by the cutting platform via a link which is connected at one end to the platform in a manner to allow the link to pivot relative to the platform about a first axis and which is secured at its other end to the divider in a manner to allow the divider to pivot relative to the link about a second axis which is inclined relative to the first axis.

2. A cutting platform according to claim 1, wherein the cutting platform further comprises a support arm to which the link is pivotally connected at the one end that can be raised and lowered to enable the height of the divider above the ground during operation to be adjusted.

3. A cutting platform according to claim 1, wherein the link is pivotable relative to the cutting platform about a generally horizontal axis.

4. A cutting platform according to claim 1, wherein the second axis is perpendicular to the first axis.

5. A cutting platform according to claim 1, wherein the directions in which the crop divider points when in the operating and transport positions are opposite to one another.

6. A cutting platform according to claim 1, wherein a clamp is provided for locking the divider relative to the support arm when in its operating position.

7. A cutting platform according to claim 1, wherein a storing device is provided on the cutting platform to support the weight of the divider in the transport position and to prevent the divider from pivoting about the second axis relative to the link.

8. A cutting platform according to claim 7, wherein the storing device is a U-shaped bracket.

9. A method for actuating a crop divider between a forward operating position and a retracted transport position relative to a cutting platform for a combine harvester, the steps comprising:
    (A) supporting the crop divider at the cutting platform via a link secured at one end to the platform and at its other end to the crop divider;
    (B) pivoting the link relative to the cutting platform about a first axis; and
    (C) pivoting the divider relative to the link about a second axis which is inclined relative to the first axis.

10. The method as recited in claim 9, wherein the cutting platform further comprises a support arm connected to the link, further comprising the step of:
    (D) adjusting a height of the support arm to enable a height of the divider to be adjusted.

11. The method as recited in claim 9, wherein step (B) further comprises pivoting the link relative to the cutting platform about a generally horizontal axis.

12. The method as recited in claim 9, wherein step (C) further comprises pivoting the divider in a direction generally perpendicular to the first axis.

13. The method as recited in claim 9, further comprising positioning a direction in which the crop divider points in opposing directions when the crop divider is in the operating and transport positions, respectively.

14. The method as recited in claim 9, further comprising locking the crop divider relative to the support arm with a clamp when the crop divider is in its operating position.

15. The method as recited in claim 9, further comprising:
    (D) supporting the weight of the crop divider in the transport position with a storing device on the cutting platform to support the weight of the divider in the transport position; and
    (E) preventing the divider from pivoting about the second axis relative to the link.

16. A cutting platform for a combine harvester fitted with a crop divider that is pivotable relative to the cutting platform between a forwards projecting operating position and a retracted transport position, the cutting platform comprising:
  means for supporting the divider at the cutting platform;
  means for pivoting the supporting means about a first axis relative to the cutting platform;
  means for pivoting the divider about a second axis that is inclined relative to the first axis.

17. The cutting platform as recited in claim 16, wherein the means for supporting comprises a support arm and a link connected between the support arm and the crop divider.

18. The cutting platform as recited in claim 17, further comprising means for locking the divider relative to the support arm when in its operating position.

19. The cutting platform as recited in claim 16, wherein the first axis is generally horizontal.

20. The cutting platform as recited in claim 16, wherein the second axis is perpendicular to the first axis.

* * * * *